United States Patent Office 2,961,299
Patented Nov. 22, 1960

2,961,299

PRODUCTION OF VOLATILE BORANES

Lawrence J. Edwards, Zelienople, Pa., assignor to Callery Chemical Company, Pittsburgh, Pa., a corporation of Pennsylvania No Drawing. Filed Feb. 19, 1959, Ser. No. 794,261

7 Claims. (Cl. 23—204)

This invention relates to a new method for the preparation of diborane and alkyl diboranes from alkali metal borohydrides.

Diborane, $B_2H_6$, and its alkyl derivatives, $R_xB_2H_{6-x}$ where $x$ is an integer from 1 to 4 and R is an alkyl group, are becoming more and more important as basic compounds of borane chemistry. They are of interest not only for specialized fuel applications but also as intermediates in the preparation of a variety of organoboron compounds, many of which are attracting wide interest as fuel additives, fungicides, herbicides, and for other industrial and domestic uses.

It has been recognized that an attractive route for the preparation of diborane and the alkyl diboranes would utilize the alkali metal borohydrides. Thus, several methods have been used to prepare diborane from borohydrides; for example, the reaction of lithium borohydride with boron trifluoride. However, such processes have not been found to be completely satisfactory for various reasons, so that new methods are constantly being sought. In addition, where a mixture of alkyl diboranes and diborane is desired the methods used heretofore require that diborane be initially produced and subsequently alkylated.

It is therefore one object of this invention to provide a novel method for the preparation of diborane and alkyl deboranes from an alkali metal borohydride and a trialkylboroxine.

Another object is to provide a method whereby a mixture of diborane and alkyl diboranes is produced directly.

Other objects will become apparent from time to time hereinafter.

This invention is based upon my discovery that contacting an alkali metal borohydride, $MBH_4$ where M is an alkali metal, with a trialkylboroxine, $R_3B_3O_3$ where R is a lower alkyl group, produces a mixture of diborane and alkyl diboranes.

The reaction takes place slowly at ordinary temperatures, especially if no solvent is used, so that it is preferred to carry out the reaction at elevated temperatures and in an inert solvent for the borohydride. When carried out in such a solvent, temperatures between about 60° C. and 100° C. are generally used, but in the absence of a solvent higher temperatures, i.e., several hundred degrees centigrade, are preferred in order to cause the reaction to take place at a faster rate.

The solvents which may be used include those in which the borohydride reactant is soluble and which are substantially inert to the reactants and products in the system. The ethyleneglycol dimethylethers, $$CH_3(OC_2H_4)_nOCH_3$$

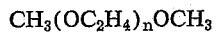

where $n$ is an integer from 1 to 4, are especially suitable since they exhibit an appreciable solubility for the alkali metal borohydrides including sodium borohydride, and in addition are of sufficiently high boiling point to permit the use of elevated temperatures at atmospheric pressure. Other solvents may be chosen with respect to their ability to dissolve the specific borohydride used; for example, tetrahydrofuran may be used as a solvent for lithium borohydride.

Although the operability of this method is not dependent upon the ratio of reactants, it has been found that use of a relatively high, i.e. about 10 to 1, molar ratio of trialkylboroxine to borohydride improves the extent of conversion of hydridic hydrogen in the borohydride to hydridic hydrogen in the volatile boranes obtained.

The products of the reaction, as well as to some extent the reactants used, are reactive with oxygen and water. For this reason it is necessary to exclude as far as possible moisture and air from the reaction site. Small amounts of such substances, however, do not render the process inoperative but merely reduce the amount of desired products recovered.

In one test demonstrating the invention herein described, an evacuated glass reaction flask was charged with 19.01 millimoles of triethylboroxine, $(C_2H_5)_3B_3O_3$, 1.51 millimoles of sodium borohydride, $NaBH_4$, and 1.8 milliliters of tetraethyleneglycol dimethylether, $$CH_3(OC_2H_4)_4OCH_3$$

The reaction mixture was then heated at 60° C. for 16 hours. The volatile products of the reaction were recovered by distillation into another flask and analyzed by conventional techniques including the measurement of hydrogen evolved upon hydrolysis. It was found that the products were diborane and ethyl diboranes and that 68% of the hydridic hydrogen charged as sodium borohydride had been converted to these volatile boranes.

In another test, conducted similarly but in which the molar ratio of triethylboroxine to borohydride was only 5 to 1, the reaction proceeded in the manner described above but only 23% of the hydridic hydrogen charged was recovered in the volatile products.

If desired, the diborane and alkyldiboranes may be separated by fractional condensation, distillation, selective adsorption, or other conventional technique. The product as it is formed comprises mainly alkyldiboranes, so that by use of such a purification step this method may be used as a convenient means of preparing these compounds.

Other tests have established that other alkali metal borohydrides such as lithium borohydride, $LiBH_4$, and potassium borohydride, $KBH_4$, are useful in the practice of this invention. Similarly, other tri-lower alkylboroxines, such as trimethylboroxine, $(CH_3)_3B_3O_3$, and other solvents, including ethers such as triethyleneglycol dimethylether, $CH_3(OC_2H_4)_3OCH_3$, may also be used. When trimethylboroxine is used, this method provides a method for the preparation of methyldiboranes, which are difficult to prepare by ordinary means.

The trialkylboroxines, while generally having the formula $R_3B_3O_3$, may be regarded as equi-molar adducts of $R_3B$ and $B_2O_3$. In some cases, the products obtained from certain methods used for their preparation contains more of either the $R_3B$ or the $B_2O_3$ portion than the other. Such products may be used in the practice of this invention and are intended to be included in the scope of the names and formulas used for the trialkylboroxines throughout this specification and claims.

According to the provisions of the patent statutes, I have explained the principle and mode of practicing my invention, have described what I now consider to be its best embodiments. However, I desire to have it understood that within the scope of the appended claims, the invention may be practiced otherwise than as specifically described.

I claim:

1. A method of producing diborane and alkyl diboranes which comprises reacting an alkali metal borohydride with a trialkylboroxine of the formula $R_3B_3O_3$, where R is a lower alkyl group, and recovering the volatile boranes thus formed.

2. A method according to claim 1 and carried out in an inert solvent for the borohydride.

3. A method according to claim 2 in which the solvent is an ethyleneglycol dimethylether of the formula $$CH_3(OC_2H_4)_nOCH_3$$

where $n$ is an integer from 1 to 4.

4. A method according to claim 2 and carried out at a temperature between about 60° C. and 100° C.

5. A method according to claim 1 in which the molar ratio of trialkylboroxine is at least about 10 to 1.

6. A method of producing diborane and ethyl diboranes which comprises reacting sodium borohydride, $NaBH_4$, with triethylboroxine, $(C_2H_5)_3B_3O_3$, in presence of an ethyleneglycol dimethylether of the formula $$CH_3(OC_2H_4)_nOCH_3$$

where $n$ is an integer from 1 to 4 and recovering the volatile boranes thus formed.

7. A method of producing diborane and methyldiboranes which comprises reacting sodium borohydride, $NaBH_4$, with trimethylboroxine, $(CH_3)_3B_3O_3$, in the presence of an ethyleneglycol dimethylether of the formula $CH_3(OC_2H_4)_nOCH_3$ where $n$ is an integer from 1 to 4 and recovering the volatile boranes thus formed.

No references cited.